United States Patent
Du et al.

(10) Patent No.: US 11,322,743 B2
(45) Date of Patent: May 3, 2022

(54) NEGATIVE ELECTRODE COMPOSITE MATERIAL AND PREPARATION METHOD THEREOF AND LITHIUM ION BATTERY

(71) Applicant: Ningde Amperex Technology Limited, Fujian (CN)

(72) Inventors: Peng Du, Fujian (CN); Yuansen Xie, Fujian (CN); Yisong Su, Fujian (CN); Fan Yang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 140 days.

(21) Appl. No.: 16/172,852

(22) Filed: Oct. 28, 2018

(65) Prior Publication Data

US 2020/0036004 A1    Jan. 30, 2020

(30) Foreign Application Priority Data

Jul. 26, 2018 (CN) .......................... 201810837602.0

(51) Int. Cl.
| | | |
|---|---|---|
| *H01M 10/0525* | (2010.01) | |
| *H01M 4/583* | (2010.01) | |
| *H01M 4/587* | (2010.01) | |
| *H01M 4/36* | (2006.01) | |
| *H01M 4/48* | (2010.01) | |
| *H01M 4/505* | (2010.01) | |
| *H01M 4/525* | (2010.01) | |
| *H01M 4/04* | (2006.01) | |
| *H01M 4/02* | (2006.01) | |

(52) U.S. Cl.
CPC ......... *H01M 4/505* (2013.01); *H01M 4/0471* (2013.01); *H01M 4/364* (2013.01); *H01M 4/48* (2013.01); *H01M 4/525* (2013.01); *H01M 4/583* (2013.01); *H01M 4/587* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 9,553,307 B2 * | 1/2017 | Lee ........................ H01M 4/366 |
|---|---|---|
| 2014/0234710 A1 | 8/2014 | Lee et al. |
| 2015/0140359 A1 * | 5/2015 | Park ..................... H01M 4/0416 429/5 |
| 2018/0072575 A1 * | 3/2018 | Gulas ........................ C09C 1/56 |

FOREIGN PATENT DOCUMENTS

| CN | 102479948 A | 5/2012 |
|---|---|---|
| CN | 104659343 | 5/2015 |
| CN | 105355852 | 2/2016 |

OTHER PUBLICATIONS

Du, Peng; Office Action for Chinese patent application No. 20180837602.0, filed Jul. 26, 2018, dated Aug. 26, 2020, 11 pgs.

Guo, et al.; Article entitled: "Preparation and electrochemical property of TiO2/Nano-graphite composite anode for electro-catalytic degradation of ceftriaxone sodium", Electrochimica Acta 180 (2015), 8 pgs.

Rahman, et al.; Article entitled: "Enhanced lithium storage in Fe2O3—SnO2—C nanocomposite anode with a breathable structure", Nanoscale, 2013, 7 pgs.

\* cited by examiner

*Primary Examiner* — Jonathan Crepeau

(74) *Attorney, Agent, or Firm* — Taylor English Duma LLP

(57) ABSTRACT

The present application relates to a negative electrode composite material and preparation thereof and a lithium ion battery. The negative electrode composite material comprises an active material, a metal oxide on the surface of the active material, wherein the ratio of the specific surface area of the negative electrode composite material to the specific surface area of the active material is 1-7. The present application improves the volume energy density and safety performance of a lithium ion battery by selecting a ratio of a specific surface area of the negative electrode composite material to the active material.

12 Claims, No Drawings

NEGATIVE ELECTRODE COMPOSITE MATERIAL AND PREPARATION METHOD THEREOF AND LITHIUM ION BATTERY

CROSS-REFERENCE TO RELATED APPLICATION

This application claims priority to and benefits of Chinese Patent Application Serial No. 201810837602.0, filed with the China National Intellectual Property Administration on Jul. 26, 2018, and the entire content of which is incorporated herein by reference.

FIELD OF THE APPLICATION

The present application relates to the field of battery, in particular, to a negative electrode composite material and preparation thereof and a lithium ion battery.

BACKGROUND OF THE APPLICATION

In order to improve the nail test performance of the lithium ion battery, introducing an inorganic insulating coating such as aluminum oxide to the surface of the positive electrode, the negative electrode or the separator in lithium ion battery. When the steel needle is inserted into the electrode assembly, a structure of steel needle-insulating coating-electrode is formed, which can increase the resistance of the short-circuit point. However, this increases the number of processing steps, requires specific processing equipment, and also reduces the pass rate of the electrodes or separators. Furthermore, the presence of an inorganic insulating coating affects the volume energy density of a lithium ion battery. Therefore, there is an urgent need for a negative electrode material capable of improving the safety performance of a lithium ion battery while maintaining a high energy density.

SUMMARY OF THE APPLICATION

The object of the present invention is to provide a negative electrode composite material and preparation method, and a lithium ion battery comprises the negative electrode composite material having good cycle performance, high volume energy density, and high safety performance.

The present application provides a negative electrode composite material comprising an active material and a metal oxide on the surface of the active material, the ratio of the specific surface area of the negative electrode composite material to the specific surface area of the active material being 1-7.

In some embodiments of the present application, wherein the negative electrode composite material has a median diameter D50 of 9 to 30 μm.

In some embodiments of the present application, wherein the metal oxide accounts for 0.1% to 15% by mass of the negative electrode composite material.

In some embodiments of the present application, wherein the metal oxide comprises one or more of a nanoparticle, a nanowire and a nanosheet.

In some embodiments of the present application, wherein the nanoparticle has a median diameter D50 of 0.5-100 nm; the nanowires have a length to diameter ratio of 2-200; the nanosheet has a sheet thickness of 0.5-10 nm and a sheet aspect ratio of 1-10.

In some embodiments of the present application, wherein the active material comprises one or more of natural graphite, artificial graphite, amorphous carbon material and silicon material; the amorphous carbon material comprises one or more of mesocarbon microbeads (MCMB), hard carbon materials and soft carbon material; the metal oxide comprises an oxide of one or more of zirconium, nickel, cobalt, manganese, boron, magnesium, calcium, strontium, barium, titanium, vanadium, iron, copper or aluminum.

The present application further provides a method for preparing the negative electrode composite material comprising: dispersing an active material in a first solvent to prepare a first solution, adding an alkoxide of a metal oxide to a pre-acidified second solvent to prepare a sol-gel solution, adding the sol-gel solution to the first solution, and stirring, standing to remove the first solvent and the second solvent, then drying and performing heat treatment under an inert gas to obtain a negative electrode composite material.

In some embodiments of the present application, wherein the first solvent is one or more of ethanol, n-propanol and isopropanol; the second solvent is one or more of n-propanol, isopropanol and n-butanol.

In some embodiments of the present application, wherein the value of pH of the first solution meets $2<pH<7$, the metal oxide comprises nanoparticles; or adding one or more of polyvinylpyrrolidone (PVP), cetyltrimethylammonium bromide and polymethyl methacrylate to the first solution before adding the sol-gel solution to the first solution, the metal oxide comprises nanowires; or the value of pH of the first solution meets $7<pH<12$, the metal oxide comprises a nanosheet.

The present application further provides a negative electrode, wherein the negative electrode comprises the above negative electrode composite material The present application further provides a lithium ion battery, wherein the lithium ion battery comprises the above negative electrode.

By using the negative electrode composite material comprising an active material and a metal oxide on the surface of the active material, and by selecting an appropriate ratio of a specific surface area of the negative electrode composite material to the active material, allowing the prepared lithium ion battery to have a good cycle performance, a high volume energy density and a high safety performance.

DETAILED DESCRIPTION OF THE PREFERRED EXAMPLES

The exemplary embodiments are described in sufficient detail below, but these exemplary embodiments may be implemented in various ways and should not be construed as being limited to the examples set forth herein. Rather, these embodiments are provided so that the present application will be thorough and complete and the scope of the present application is fully conveyed to those skilled in the art.

According to embodiments of the present application, a negative electrode composite material is provided. The negative electrode composite material comprises an active material and a metal oxide on the surface of the active material. The active material comprises one or more of natural graphite, artificial graphite, amorphous carbon material and silicon material; the amorphous carbon material comprises one or more of mesocarbon microbeads, hard carbon materials and soft carbon material; the metal oxide comprises an oxide of one or more of zirconium, nickel, cobalt, manganese, boron, magnesium, calcium, strontium, barium, titanium, vanadium, iron, copper and aluminum.

The valence of the metal cation in the metal oxide may be shown to be +1, +2, +3, +4, comprising a form in which one or more valence states coexist. Due to the metal oxide present on the surface of the active material, the violent failure reaction rate at the interface between the active material and the electrolyte is suppressed, and the safety performance of the lithium ion battery is improved such as nailing, overcharging, short circuit, thermal shock performance without substantially affecting the volume energy density of the lithium ion battery.

According to embodiments of the present application, the ratio of the specific surface area of the negative electrode composite material to the specific surface area of the active material is 1-7. As such, the purpose of improving the safety performance of the lithium ion battery may be achieved, and the influence on the cycle performance of the lithium ion battery may be minimized. If the ratio of the specific surface area of the negative electrode composite material to the specific surface area of the active material is too large, the lithium ion battery consumes more lithium ions during the initial charging process, causing excessive initial capacity loss and requiring more binder, which leads to increased internal resistance, thereby directly affecting the cycle performance of lithium ion battery; conversely, if the ratio of the specific surface area of the negative electrode composite material to the specific surface area of the active material is too small, the number of the active site of the negative electrode composite material is less and the surface wettability of the negative electrode composite material is poor, leading the slurry rheology stability to be deviated and the charge and discharge performance and cycle performance of the lithium ion battery to be deteriorated. According to examples of the present application, the specific surface area of the negative electrode composite material may be in the range of 1.3~10 $m^2/g$.

According to embodiments of the present application, the negative electrode composite material has a median diameter D50 of 9 to 30 μm. When the particle size is too large, the stability of the slurry may be affected and sedimentation and poor consistency of the slurry may occur; in the coating process, there may be a blockage of the material, and the pitting will occur after the electrode is dried, causing a quality problem of the electrode; in the rolling process, poor coating due to uneven force easily causes breakage, local microcracks for the electrode; so it is extremely harmful to the cycle performance, rate performance and safety performance of the lithium ion battery. When the particle size is too small, the entire intercalation-deintercalation process of lithium ion may be directly affected by the spatial effect caused by factors such as the particle morphology of the negative electrode composite material and the accumulation between the particles, thereby significantly affecting the ion migration rate and the charge and discharge platform of the lithium ion battery.

According to embodiments of the present application, the metal oxide accounts for 0.1% to 15% by mass of the negative electrode composite material. If the metal oxide accounts for less than 0.1% by mass of the negative electrode composite material, it does not function to effectively suppress the failure reaction rate at the interface between the active material and the electrolyte; if the metal oxide accounts for more than 15% by mass of the negative electrode composite material, the metal oxide is too thick, thereby affecting the volume energy density of the lithium ion battery.

According to embodiments of the present application, the metal oxide comprises one or more of a nanoparticle, a nanowire and a nanosheet structure. The nanoparticle has a median diameter of 0.5-100 nm; the nanowires have a length to diameter ratio of 2-200; the nanosheet has a sheet thickness of 0.5-10 nm and a sheet aspect ratio of 1-10. The difference in the morphology and size of the metal oxide may result in a change in the overall performance of the lithium ion battery. If the size of the metal oxide is too small (the nanoparticle has a diameter of <0.5 nm; the nanowires have an length to diameter ratio of <2; the nanosheet has a thickness of <0.5 nm and an aspect ratio of <1), the specific surface area of the negative electrode composite material is too large, thereby causing the ratio of the specific surface area of the negative electrode composite material to the specific surface area of the active material to be too large. Conversely, if the size of the metal oxide is too large (the nanoparticle has a diameter of >100 nm; the nanowires have an length to diameter ratio of >200; the nanosheet has a thickness of >10 nm and an aspect ratio of >10), the specific surface area of the negative electrode composite material is small, thereby causing the ratio of the specific surface area of the negative electrode composite material to the specific surface area of the active material to be too small.

According to another aspect of the present application, a method for preparing the negative electrode composite material is provided comprising dispersing an active material in a first solvent to prepare a first solution. Among them, the first solvent is one or more of ethanol, n-propanol and isopropanol. The method further comprises adding an alkoxide of a metal oxide to a pre-acidified second solvent to prepare a sol-gel solution. The alkoxide of the corresponding metal oxide is selected based on the desired metal oxide. For example, if the metal oxide is titanium dioxide, butyl titanate may be selected as the alkoxide of the metal oxide. The second solvent is one or more of n-propanol, isopropanol and n-butanol. The method further comprises adding the sol-gel solution to the first solution, and stirring, standing to remove the first solvent and the second solvent, then drying and performing heat treatment under an inert gas to obtain a negative electrode composite material.

In addition, in order to control the morphology of the metal oxide on the surface of the active material, before adding the sol-gel solution to the first solution, oxalic acid, hydrochloric acid, sulfuric acid or acetic acid or the like is added to the first solution to make it acidic, specifically, have 2<pH<7, as such the morphology of the metal oxide is a single spherical nanoparticle or two or more spherical clusters, wherein the median diameter is 0.5-100 nm; or polyvinylpyrrolidone (PVP), cetyltrimethylammonium bromide or polymethyl methacrylate or the like is added to the first solution, as such the morphology of the metal oxide is a nanowire with a length to diameter ratio (length to diameter ratio) of 2-200, wherein the larger the relative molecular weight of polyvinylpyrrolidone, the larger the length to diameter ratio of the obtained nanowire; or sodium hydroxide, potassium hydroxide, magnesium hydroxide or ammonia water is added to the first solution to make the first solution alkaline, specifically, have 7<pH<12, as such the morphology of the metal oxide is a nanosheet with a sheet thickness of 0.5-10 nm and the ratio (aspect ratio) of the length to the width of the sheet is 1-10.

In addition, the size and morphology of the metal oxide may also be controlled by the following reaction conditions: controlling the reaction time, adjusting the reaction temperature, and controlling the amount of the raw material added. If the other reaction conditions are constant, the size of the metal oxide (the diameter of spherical nanoparticles, the length to diameter ratio of nanowire, the aspect ratio of nanosheet) gradually increases with the reaction time until the reaction is complete, and the reaction time ranges from 5 to 30 min. If the other reaction conditions are constant, as the reaction temperature increases, the size of the metal oxide (the diameter of spherical nanoparticles, the length to diameter ratio of nanowire, the aspect ratio of nanosheet) grows faster, and the reaction temperature ranges from 20 to 70° C. If other reaction conditions are unchanged, the addition of excess raw materials and the uneven reaction system may easily form a single spherical nanoparticle, and even two or more spherical nanoparticles may be aggregated.

According to examples of the present application, a negative electrode comprising the above negative electrode composite material and a lithium ion battery comprising the negative electrode are provided. The lithium ion battery comprises a positive electrode, a negative electrode, a separator, an electrolyte, and the like, wherein the negative electrode is the negative electrode described in the present application.

positive electrode

The positive electrode comprises a positive electrode material capable of intercalating and deintercalating lithium (Li) (hereinafter, sometimes referred to as "positive electrode material capable of intercalating/deintercalating lithium Li"). Examples of the positive electrode material capable of intercalating/deintercalating lithium Li may comprise lithium cobalt oxide, lithium nickel cobalt manganese oxide, lithium nickel cobalt aluminate oxide, lithium manganate, lithium manganese iron phosphate, lithium vanadium phosphate, lithium vanadium phosphate, lithium iron phosphate, lithium titanate, and lithium-rich manganese-based materials.

Specifically, the chemical formula of lithium cobalt oxide may be as chemical formula 1:

$$Li_xCo_aM1_bO_{2-c} \qquad \text{formula 1}$$

wherein M1 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b and c are respectively in the following ranges: $0.8 \leq x \leq 1.2$, $0.8 \leq a \leq 1$, $0 \leq b \leq 0.2$, $-0.1 \leq c \leq 0.2$;

the chemical formula of lithium nickel cobalt manganese oxide or lithium nickel cobalt aluminate oxide may be as chemical formula 2:

$$Li_yNi_dM2_eO_{2-f} \qquad \text{formula 2}$$

wherein M2 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and the values of y, d, e and f are respectively in the following ranges: $0.8 \leq y \leq 1.2$, $0.3 \leq d \leq 0.98$, $0.02 \leq e \leq 0.7$, $-0.1 \leq f \leq 0.2$;

the chemical formula of lithium manganese oxide may be as chemical formula 3:

$$Li_zMn_{2-g}M3_gO_{4-h} \qquad \text{formula 3}$$

wherein M3 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g, and h are respectively in the following ranges: $0.8 \leq z \leq 1.2$, $0 \leq g \leq 1.0$ and $-0.2 \leq h \leq 0.2$.

electrolyte

The electrolyte comprises a lithium salt and a non-aqueous solvent.

The lithium salt comprises at least one selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, LiBOB, LiBr and lithium difluoroborate. For example, $LiPF_6$ is selected as the lithium salt because it may cause high ionic conductivity and improved cycle characteristics.

The non-aqueous solvent may be a carbonate compound, an ester-based compound, an ether-based compound, a ketone-based compound, an alcohol-based compound, an aprotic solvent, or a combination thereof.

The carbonate compound may be a chain carbonate compound, a cyclic carbonate compound, a fluorocarbonate compound, or a combination thereof.

Examples of the chain carbonate compound are diethyl carbonate (DEC), dimethyl carbonate (DMC), dipropyl carbonate (DPC), methylpropyl carbonate (MPC), ethylene propyl carbonate (EPC), and carbonic acid. Ethyl ester (MEC) and combinations thereof.

When the above chain carbonate compound is used, in the nonaqueous electrolyte, the content is usually from 0.5% to 50% based on the total weight of the electrolyte.

Examples of the cyclic carbonate compound are ethylene carbonate (EC), propylene carbonate (PC), butylene carbonate (BC), vinyl ethylene carbonate (VEC), and combinations thereof.

When the above cyclic carbonate compound is used, in the nonaqueous electrolyte, the content is usually from 0.5% to 50% based on the total weight of the electrolyte.

Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethyl ethylene carbonate, trifluoroethyl methyl ethylene carbonate, and combinations thereof.

When the above fluorocarbonate compound is used, in the nonaqueous electrolyte, the content is usually from 0.5% to 10% based on the total weight of the electrolyte.

Examples of the ester-based compound are methyl acetate, ethyl acetate, n-propyl acetate, t-butyl acetate, methyl propionate, ethyl propionate, propyl propionate, butyl propionate, methyl butyrate, ethyl butyrate, propyl butyrate, methyl valerate, ethyl valerate, methyl pivalate, ethyl pivalate, butyl pivalate, γ-butyrolactone, azlactone, valerolactone, mevalonolactone, caprolactone, methyl formate and combinations thereof.

When the above ester-based compound is used, in the nonaqueous electrolyte, the content is usually from 1% to 50% based on the total weight of the electrolyte.

Examples of the ether-based compound are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

When the above ether-based compound is used, in the nonaqueous electrolyte, the content is usually from 0.1% to 10% based on the total weight of the electrolyte.

An example of the ketone-based compound is cyclohexanone.

Examples of alcohol-based compounds are ethanol and isopropanol.

Examples of aprotic solvent are dimethyl sulfoxide, 1,2-dioxolane, 1,3-dioxolane, 1,4-dioxane, sulfolane, methyl sulfolane, 1,3-dimethyl-2-imidazolidinone, N-methyl-2-pyrrolidone, formamide, dimethylformamide, acetonitrile, nitromethane, trimethyl phosphate, triethyl phosphate, trioctyl phosphate and phosphate, and combinations thereof.

separator

The separator comprises at least one selected from the group consisting of polyethylene, polypropylene, polyethylene terephthalate, polyimide, and aramid. For example, the polyethylene comprises at least one component selected from the group consisting of high density polyethylene, low density polyethylene, and ultra high molecular weight polyethylene. In particular, polyethylene and polypropylene, which have a good effect on preventing short circuits, may improve the stability of the battery by the shutdown effect.

The separator surface may further comprise a porous layer arranged on at least one surface of the separator, the porous layer comprising inorganic particles and a binder. The inorganic particle is selected from one or more of alumina ($Al_2O_3$), silica ($SiO_2$), magnesia (MgO), titania ($TiO_2$), ceria ($HfO_2$), tin oxide ($SnO_2$), cerium oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide and barium sulfate. The binder is selected from the group consisting of polyvinylidene fluoride, a copolymer of vinylidene fluoride-hexafluoropropylene, polyamide, polyacrylonitrile, polyacrylate, polyacrylic acid, polyacrylate, sodium carboxymethylcellulose, polyvinylpyrrolidone, polyvinyl ether, polymethylmethacrylate, polytetrafluoroethylene and polyhexafluoropropylene.

The porous layer on the surface of the separator may improve the heat resistance, oxidation resistance and electrolyte wetting property of the separator, and enhance the adhesion between the separator and the electrode.

The positive electrode, the separator, the negative electrode are sequentially wound or folded into a bare cell, and then sealed (for example, in an aluminum plastic film) for encapsulation, and injected with an electrolyte for formation and packaging, thus a lithium ion battery is made.

Those skilled in the art will appreciate that the above described methods for preparing the lithium ion battery are merely examples. Other methods commonly used in the art may be employed without departing from the disclosure of the present application.

Some specific examples and comparative examples are listed below to better illustrate the application.

Comparative Example 1

0.9 kg of artificial graphite is dispersed in ethanol to obtain a first solution. 0.025 mol of citric acid is dissolved in 500 mL of isopropanol; after completely dissolved, 1.25 mol of butyl titanate is added and stirred at 500 rpm for at least 30 minutes, to obtain a titanium dioxide sol-gel solution after filtration through a water-based filter. 1000 mL of titanium dioxide sol gel solution is taken for adding to the first solution, stirring for 110 minutes, and then allowed to stand for 180 minutes, preliminarily dried at 70° C. for 10 hours to remove the solvent, and then heat-treated at 1000° C. in an argon atmosphere to remove impurities, to obtain a negative electrode composite material. The formed negative electrode composite material has a median diameter D50 of 15 μm, and the morphology of the metal oxide is spherical nanoparticles. The ratio of the specific surface area of the negative electrode composite material to the specific surface area of the artificial graphite is 0.8, and the metal oxide accounts for 1.00% by mass of the negative electrode composite material.

The negative electrode composite material, a conductive agent of acetylene black, a binder of styrene-butadiene rubber (SBR), and a thickener of sodium carboxymethyl cellulose (CMC) are dissolved in a deionized water solvent system according to the weight ratio of 95:2:2:1; after thorough mixing, the temperature is controlled at 25-30° C. and stirring is continued until the solid content of the slurry is 45%-55%; then the slurry is coated on a negative current collector of copper foil for drying, compacting, cutting, slitting, and welding with an electrode tab to obtain a negative electrode of the lithium ion battery.

A positive active material of $LiCoO_2$ (D50 is 18 μm), the conductive agent of acetylene black, and a binder of polyvinylidene fluoride (PVDF) are dissolved in a N-methylpyrrolidone solvent system at a weight ratio of 94:3:3 for thoroughly stirring and mixing to obtain a positive electrode slurry; then the positive electrode slurry is coated on a positive current collector of aluminum foil for drying, compacting, cutting, slitting, and welding with the electrode tab to obtain a positive electrode of the lithium ion battery.

The electrolyte of the lithium ion battery has a lithium salt of lithium hexafluorophosphate ($LiPF_6$) at a concentration of 1 M, and a non-aqueous organic solvent of a mixture of ethylene carbonate (EC), diethyl carbonate (DEC) and ethyl methyl carbonate (EMC), wherein the volume ratio of the three components is EC:DEC:EMC=1:1:1.

The positive electrode, the negative electrode and the separator (polyethylene, PE) of the prepared lithium ion battery are prepared into a electrode assembly by a winding and packaging process, then baked at 85° C. for 7 hours, injected with the electrolyte, and then allowed to stand for 24 hours, to obtain a lithium ion battery.

Comparative Example 2

The preparation method is the same as that of Comparative Example 1, except that 2000 mL of a titanium dioxide sol-gel solution is added to the first solution, kept under stirring for 5 minutes, and then allowed to stand for 180 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 10.0, and the metal oxide accounts for 1.00% by mass of the negative electrode composite material.

Comparative Example 3

The preparation method is the same as that of Comparative Example 1, except that 20 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 0.07% by mass of the negative electrode composite material.

Comparative Example 4

The preparation method is the same as that of Comparative Example 1, except that 20 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 16.3% by mass of the negative electrode composite material.

Example 1

The preparation method is the same as that of Comparative Example 1, except that 500 mL of a titanium dioxide sol-gel solution is added to the first solution, kept under stirring for 180 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.0, and the metal oxide accounts for 1.00% by mass of the negative electrode composite material.

Example 2

The preparation method is the same as that of Comparative Example 1, except that 500 mL of a titanium dioxide sol-gel solution is added to the first solution, kept under stirring for 150 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.2, and the metal oxide accounts for 1.00% by mass of the negative electrode composite material.

Example 3

The preparation method is the same as that of Comparative Example 1, except that 500 mL of a titanium dioxide sol-gel solution is added to the first solution, kept under stirring for 120 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.4, and the metal oxide accounts for 1.00% by mass of the negative electrode composite material.

Example 4

The preparation method is the same as that of Comparative Example 1, except that 500 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 5

The preparation method is the same as that of Comparative Example 1, except that 500 mL of a titanium dioxide sol-gel solution is added to the first solution, kept under stirring for 90 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.7, and the metal oxide accounts for 1.00% by mass of the negative electrode composite material.

Example 6

The preparation method is the same as that of Comparative Example 1, except that 500 mL of a titanium dioxide sol-gel solution is added to the first solution, kept under stirring for 70 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.9, and the metal oxide accounts for 1.00% by mass of the negative electrode composite material.

Example 7

The preparation method is the same as that of Comparative Example 1, except that 500 mL of a titanium dioxide sol-gel solution is added to the first solution, kept under stirring for 30 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 2.0, and the metal oxide accounts for 1.00% by mass of the negative electrode composite material.

Example 8

The preparation method is the same as that of Comparative Example 1, except that 500 mL of a titanium dioxide sol-gel solution is added to the first solution, kept under stirring for 20 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 2.5, and the metal oxide accounts for 1.00% by mass of the negative electrode composite material.

Example 9

The preparation method is the same as that of Comparative Example 1, except that 500 mL of a titanium dioxide sol-gel solution is added to the first solution, kept under stirring for 15 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 4.0, and the metal oxide accounts for 1.00% by mass of the negative electrode composite material.

Example 10

The preparation method is the same as that of Comparative Example 1, except that 500 mL of a titanium dioxide sol-gel solution is added to the first solution, kept under stirring for 10 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 6.0, and the metal oxide accounts for 1.00% by mass of the negative electrode composite material.

Example 11

The preparation method is the same as that of Comparative Example 1, except that 500 mL of a titanium dioxide sol-gel solution is added to the first solution, kept under stirring for 5 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 7.0, and the metal oxide accounts for 1.00% by mass of the negative electrode composite material.

Example 12

The preparation method is the same as that of Comparative Example 1, except that 50 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 0.1% by mass of the negative electrode composite material.

Example 13

The preparation method is the same as that of Comparative Example 1, except that 125 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 0.25% by mass of the negative electrode composite material.

Example 14

The preparation method is the same as that of Comparative Example 1, except that 250 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 0.50% by mass of the negative electrode composite material.

Example 15

The preparation method is the same as that of Comparative Example 1, except that 300 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 0.60% by mass of the negative electrode composite material.

Example 16

The preparation method is the same as that of Comparative Example 1, except that 350 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 0.70% by mass of the negative electrode composite material.

Example 17

The preparation method is the same as that of Comparative Example 1, except that 400 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 0.80% by mass of the negative electrode composite material.

Example 18

The preparation method is the same as that of Comparative Example 1, except that 1500 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 3.00% by mass of the negative electrode composite material.

Example 19

The preparation method is the same as that of Comparative Example 1, except that 2500 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 5.00% by mass of the negative electrode composite material.

Example 20

The preparation method is the same as that of Comparative Example 1, except that 5000 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 10.00% by mass of the negative electrode composite material.

Example 21

The preparation method is the same as that of Comparative Example 1, except that 7500 mL of a titanium dioxide sol-gel solution is added to the first solution, kept under stirring for 110 minutes, and then allowed to stand for 30 minutes. The formed negative electrode composite material has a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 15.00% by mass of the negative electrode composite material.

Example 22

The preparation method is the same as that of Comparative Example 1, except that 0.025 mol of citric acid is taken for dissolving in 500 mL of isopropanol; after completely dissolved, 0.025 mol of polyvinylpyrrolidone (PVP) and 1.25 mol of butyl titanate are added and stirred at 500 rpm for at least 30 minutes, to obtain a titanium dioxide sol-gel solution after filtration through a water-based filter. 500 mL of a titanium dioxide sol-gel solution is added to the first solution, kept under stirring for 110 minutes, and then allowed to stand for 30 minutes. The ratio of the specific surface area of the formed negative electrode composite material to the specific surface area of the artificial graphite is 1.6, the morphology of the metal oxide is nanowires and the metal oxide accounts for 1.00% by mass of the negative electrode composite material.

Example 23

The preparation method is the same as that of Comparative Example 1, except that 0.025 mol of citric acid is taken for dissolving in 500 mL of isopropanol; after completely dissolved, 10 mL of 0.25 mol/L potassium hydroxide aqueous solution and 1.25 mol of butyl titanate are added and stirred at 500 rpm for at least 30 minutes, to obtain a titanium dioxide sol-gel solution after filtration through a water-based filter. 1500 mL of a titanium dioxide sol-gel solution is added to the first solution, kept under stirring for 5 minutes, and then allowed to stand for 30 minutes. The ratio of the specific surface area of the formed negative electrode composite material to the specific surface area of the artificial graphite is 1.6, the morphology of the metal oxide is nanosheet and the metal oxide accounts for 1.00% by mass of the negative electrode composite material.

Example 24

The preparation method is the same as that of Comparative Example 1, except that 1500 mL of a titanium dioxide sol-gel solution is added to the first solution, kept under stirring for 5 minutes, and then allowed to stand for 30 minutes. The formed negative electrode composite material has a median diameter D50 of 9 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 25

The preparation method is the same as that of Comparative Example 1, except that 1500 mL of a titanium dioxide sol-gel solution is added to the first solution, kept under stirring for 10 minutes, and then allowed to stand for 30 minutes. The formed negative electrode composite material has a median diameter D50 of 12 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 26

The preparation method is the same as that of Comparative Example 1, except that 1500 mL of a titanium dioxide sol-gel solution is added to the first solution, kept under stirring for 15 minutes, and then allowed to stand for 30 minutes. The formed negative electrode composite material has a median diameter D50 of 13 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 27

The preparation method is the same as that of Comparative Example 1, except that 1500 mL of a titanium dioxide sol-gel solution is added to the first solution, kept under stirring for 50 minutes, and then allowed to stand for 30 minutes. The formed negative electrode composite material has a median diameter D50 of 17 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 28

The preparation method is the same as that of Comparative Example 1, except that 1500 mL of a titanium dioxide sol-gel solution is added to the first solution, kept under stirring for 60 minutes, and then allowed to stand for 30 minutes. The formed negative electrode composite material has a median diameter D50 of 20 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 29

The preparation method is the same as that of Comparative Example 1, except that 1500 mL of a titanium dioxide sol-gel solution is added to the first solution, kept under stirring for 80 minutes, and then allowed to stand for 30 minutes. The formed negative electrode composite material has a median diameter D50 of 22 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 30

The preparation method is the same as that of Comparative Example 1, except that 1500 mL of a titanium dioxide sol-gel solution is added to the first solution, kept under stirring for 100 minutes, and then allowed to stand for 30 minutes. The formed negative electrode composite material has a median diameter D50 of 27 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 31

The preparation method is the same as that of Comparative Example 1, except that 1500 mL of a titanium dioxide sol-gel solution is added to the first solution, kept under stirring for 120 minutes, and then allowed to stand for 30 minutes. The formed negative electrode composite material has a median diameter D50 of 30 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 32

The preparation method is the same as that of Comparative Example 1, except that the alkoxide of the metal oxide used in Example 32 is 0.018 mol of zirconium alcohol $ZrO(C_3H_7)_4$), the metal oxide in the prepared negative electrode composite material is zirconia, and the ratio of the specific surface area of the negative electrode composite material to the specific surface area of the artificial graphite is 1.6.

Example 33

The preparation method is the same as that of Comparative Example 1, except that 0.9 kg of the negative electrode composite material prepared in Example 1 is dispersed in ethanol to obtain a first solution. 0.025 mol of citric acid is taken for dissolving in 500 mL of isopropanol; after completely dissolved, 0.018 mol of zirconium alcohol $ZrO(C_3H_7)_4$ is added and stirred at 500 rpm for at least 30 minutes, to obtain a titanium dioxide sol-gel solution after filtration through a water-based filter. 250 mL of zirconia sol gel solution is taken for adding to the first solution, kept under stirring for 110 minutes, and then allowed to stand for 30 minutes, preliminarily dried at 70° C. for 10 hours to remove the solvent, and then heat-treated at 1000° C. in an argon atmosphere for 10 minutes to remove impurities, to obtain a negative electrode composite material. The prepared negative electrode composite material has a metal oxide of zirconia-titanium oxide, a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 34

The preparation method is the same as that of Comparative Example 1, except that 0.9 kg of the negative electrode composite material prepared in Example 33 is dispersed in methanol, heated in an oil bath at 60° C., and then added with 0.037 mol of zinc acetate dihydrate and then with a potassium hydroxide solution in methanol dropwise for 15 minutes for the reaction of 3 hours, and dried at 70° C. after standing for 2 hours; to be used after the impurities are removed by heat treatment at 1000° C. The prepared negative electrode composite material has a metal oxide of zirconia-titanium oxide-zinc oxide, a median diameter D50 of 15 μm, and the morphology of the metal oxide is spherical nanoparticles. The ratio of the specific surface area of the negative electrode composite material to the specific surface area of the artificial graphite is 1.6, and the metal oxide accounts for 1.00% by mass of the negative electrode composite material.

Example 35

The preparation method is the same as that of Comparative Example 1, except that the active material used in Example 35 is natural graphite, and the ratio of the specific surface area of the negative electrode composite material to the specific surface area of the active material is 1.6.

Example 36

The preparation method is the same as that of Comparative Example 1, except that the active materials used in Example 36 are artificial graphite and hard carbon, and the ratio of the specific surface area of the negative electrode composite material to the specific surface area of the active material is 1.6.

Example 37

The preparation method is the same as that of Comparative Example 1, except that the active materials used in Example 37 are hard carbon and mesophase carbon, and the ratio of the specific surface area of the negative electrode composite material to the specific surface area of the active material is 1.6.

Thereafter, the lithium ion battery obtained in the examples and the comparative examples is subjected to cycle performance test, energy density test, overheating characteristics, tests for thermal shock characteristics and needling characteristics. The cycle performance test may take 5 lithium ion batteries prepared in all comparative examples and examples, and the average thereof is taken. The lithium ion battery is repeatedly charged and discharged by the following procedures, the discharge capacity retention rate of the lithium ion battery is calculated, and the results are shown in Table 1.

First, in the environment of 25° C., the initial charge and discharge are performed, and charging are performed with a constant current and a constant voltage at a charging current of 0.7 C until the upper limit voltage is 4.4 V; then, discharging is performed with a constant current at a discharge current of 1.0 C until the final voltage is 3 V, and the discharge capacity of the first cycle is recorded; subsequently, charging and discharging cycles are performed 200 times, and the discharge capacity at the 200th cycle is recorded.

Cycle capacity retention rate=(discharge capacity at the 200th cycle/discharge capacity at the first cycle)×100%.

test for energy density 5 lithium ion batteries prepared by the active materials in all comparative examples and examples are taken for each group, and the average thereof is taken. First, in the environment of 25° C., the initial charge and discharge are performed, and charging are performed with a constant current and a constant voltage at a charging current of 0.5 C until the upper limit voltage is 4.4 V; then, discharging is performed with a constant current at a discharge current of 0.2 C until the final voltage is 3 V. The increase percentages for energy density of the respective examples and comparative examples with respect to Comparative Example 1 are calculated, and the results are shown in Table 1.

Test for overcharge characteristics, thermal shock characteristics and puncturing characteristics 1) At 10 V, the test for overcharge is performed using a current density of 1 C rate. The shape change and surface temperature of the lithium ion battery are observed, and the results are shown in Table 1.

2) When the lithium ion battery reaches a full charge state, it is placed in a high temperature chamber at 150° C. for no more than 120 minutes to observe whether a flame appears over time, and the results are shown in Table 1.

3) The lithium-ion battery is placed in a 25° C. incubator and allowed to stand for 30 minutes to keep the lithium ion battery at a constant temperature. The lithium ion battery reaching constant temperature is charged at a constant current of 0.5 C to a voltage of 4.4 V, and then charged at a constant voltage of 4.4 V to a current of 0.025 C. The fully-charged lithium ion battery is transferred to the nail tester while keeping the test environment temperature at 25° C.±2° C., and then a steel nail with a diameter of 4 mm is used to pass through the center of the lithium ion battery at a speed of 30 mm/s for 300 s. The surface temperature of the battery is observed and the results are shown in Table 1.

4) The lithium ion battery is charged at a constant current of 0.5 C to a voltage of 4.3 V at 25° C., and then charged at a constant voltage of 4.3 V to a current of 0.05 C. The UL1642 test standard is used, wherein the mass of the hammer is 9.8 kg with a diameter of 15.8 mm, a drop height of 61±2.5 cm, to perform a heavy impact test on the lithium ion battery. The surface temperature of the battery is observed and the results are shown in Table 1.

The parameters and measurement results of the respective examples and comparative examples are shown in Table 1 below.

TABLE 1

| | ratio of the specific surface area of the negative electrode composite material to the specific surface area of the active material | mass fraction of metal oxide | morphology of metal oxide | D50 of negative electrode composite material (μm) | metal oxide | active material |
|---|---|---|---|---|---|---|
| Examples | | | | | | |
| 1 | 1.0 | 1.00% | spherical nanoparticles | 15 | titanium oxide | artificial graphite |
| 2 | 1.2 | 1.00% | spherical nanoparticles | 15 | titanium oxide | artificial graphite |
| 3 | 1.4 | 1.00% | spherical nanoparticles | 15 | titanium oxide | artificial graphite |
| 4 | 1.6 | 1.00% | spherical nanoparticles | 15 | titanium oxide | artificial graphite |
| 5 | 1.7 | 1.00% | spherical nanoparticles | 15 | titanium oxide | artificial graphite |
| 6 | 1.9 | 1.00% | spherical nanoparticles | 15 | titanium oxide | artificial graphite |
| 7 | 2.0 | 1.00% | spherical nanoparticles | 15 | titanium oxide | artificial graphite |
| 8 | 2.5 | 1.00% | spherical nanoparticles | 15 | titanium oxide | artificial graphite |
| 9 | 4.0 | 1.00% | spherical nanoparticles | 15 | titanium oxide | artificial graphite |
| 10 | 6.0 | 1.00% | spherical nanoparticles | 15 | titanium oxide | artificial graphite |

TABLE 1-continued

| | | | | | | |
|---|---|---|---|---|---|---|
| 11 | 7.0 | 1.00% | spherical nanoparticles | 15 | titanium oxide | artificial graphite |
| 12 | 1.6 | 0.10% | spherical nanoparticles | 15 | titanium oxide | artificial graphite |
| 13 | 1.6 | 0.25% | spherical nanoparticles | 15 | titanium oxide | artificial graphite |
| 14 | 1.6 | 0.50% | spherical nanoparticles | 15 | titanium oxide | artificial graphite |
| 15 | 1.6 | 0.60% | spherical nanoparticles | 15 | titanium oxide | artificial graphite |
| 16 | 1.6 | 0.70% | spherical nanoparticles | 15 | titanium oxide | artificial graphite |
| 17 | 1.6 | 0.80% | spherical nanoparticles | 15 | titanium oxide | artificial graphite |
| 4 | 1.6 | 1.00% | spherical nanoparticles | 15 | titanium oxide | artificial graphite |
| 18 | 1.6 | 3.00% | spherical nanoparticles | 15 | titanium oxide | artificial graphite |
| 19 | 1.6 | 5.00% | spherical nanoparticles | 15 | titanium oxide | artificial graphite |
| 20 | 1.6 | 10.00% | spherical nanoparticles | 15 | titanium oxide | artificial graphite |
| 21 | 1.6 | 15.00% | spherical nanoparticles | 15 | titanium oxide | artificial graphite |
| 4 | 1.6 | 1.00% | spherical nanoparticles | 15 | titanium oxide | artificial graphite |
| 22 | 1.6 | 1.00% | nanowires | 15 | titanium oxide | artificial graphite |
| 23 | 1.6 | 1.00% | nanosheet | 15 | titanium oxide | artificial graphite |
| 24 | 1.6 | 1.00% | spherical nanoparticles | 9 | titanium oxide | artificial graphite |
| 25 | 1.6 | 1.00% | spherical nanoparticles | 12 | titanium oxide | artificial graphite |
| 26 | 1.6 | 1.00% | spherical nanoparticles | 13 | titanium oxide | artificial graphite |
| 4 | 1.6 | 1.00% | spherical nanoparticles | 15 | titanium oxide | artificial graphite |
| 27 | 1.6 | 1.00% | spherical nanoparticles | 17 | titanium oxide | artificial graphite |
| 28 | 1.6 | 1.00% | spherical nanoparticles | 20 | titanium oxide | artificial graphite |
| 29 | 1.6 | 1.00% | spherical nanoparticles | 22 | titanium oxide | artificial graphite |
| 30 | 1.6 | 1.00% | spherical nanoparticles | 27 | titanium oxide | artificial graphite |
| 31 | 1.6 | 1.00% | spherical nanoparticles | 30 | titanium oxide | artificial graphite |
| 4 | 1.6 | 1.00% | spherical nanoparticles | 15 | titanium oxide | artificial graphite |
| 32 | 1.6 | 1.00% | spherical nanoparticles | 15 | zirconia | artificial graphite |
| 33 | 1.6 | 1.00% | spherical nanoparticles | 15 | titanium oxide, zirconia | artificial graphite |
| 34 | 1.6 | 1.00% | spherical nanoparticles | 15 | zirconia, titanium oxide, zinc oxide | artificial graphite |
| 35 | 1.6 | 1.00% | spherical nanoparticles | 15 | titanium oxide | natural graphite |
| 4 | 1.6 | 1.00% | spherical nanoparticles | 15 | titanium oxide | artificial graphite |
| 36 | 1.6 | 1.00% | spherical nanoparticles | 15 | titanium oxide | artificial graphite, hard carbon |
| 37 | 1.6 | 1.00% | spherical nanoparticles | 15 | titanium oxide | hard carbon, mesocarbon microspheres |
| Comparative Examples | | | | | | |
| 1 | 0.8 | 1.00% | spherical nanoparticles | 15 | titanium oxide | artificial graphite |
| 2 | 10.0 | 1.00% | spherical nanoparticles | 15 | titanium oxide | artificial graphite |

TABLE 1-continued

| | | | | | | |
|---|---|---|---|---|---|---|
| 3 | 1.6 | 0.07% | spherical nanoparticles | 15 | titanium oxide | artificial graphite |
| 4 | 1.6 | 16.3% | spherical nanoparticles | 15 | titanium oxide | artificial graphite |

| | capacity retention rate of cycle test | percentage of energy density accounted in Comparative Example 1 | maximum temperature of lithium ion battery surface (° C.) when overcharging to 10 V | withstand time for thermal shock | maximum temperature of lithium ion battery surface (° C.) after nail test | maximum temperature of lithium ion battery surface (° C.) after shock |
|---|---|---|---|---|---|---|
| Examples | | | | | | |
| 1 | 96.0% | 100.0% | D, 335 | 15 min | D, 300 | D, 330 |
| 2 | 95.9% | 100.0% | D, 290 | 25 min | D, 240 | D, 250 |
| 3 | 95.8% | 99.5% | D, 260 | 75 min | C, 230 | C, 150 |
| 4 | 95.9% | 99.5% | C, 200 | 120 min | B, 90 | B, 90 |
| 5 | 95.5% | 98.0% | C, 230 | 70 min | B, 100 | B, 95 |
| 6 | 95.4% | 97.5% | C, 250 | 65 min | C, 200 | B, 150 |
| 7 | 95.2% | 96.5% | D, 300 | 35 min | C, 230 | C, 210 |
| 8 | 93.9% | 95.0% | D, 320 | 12 min | C, 270 | C, 260 |
| 9 | 92.9% | 92.5% | D, 350 | 11 min | D, 300 | D, 330 |
| 10 | 92.4% | 90.5% | D, 470 | 10 min | D, 380 | D, 350 |
| 11 | 90.9% | 90.0% | D, 530 | 5 min | D, 470 | D, 410 |
| 12 | 95.9% | 100.0% | D, 300 | 60 min | D, 300 | D, 270 |
| 13 | 95.8% | 100.0% | D, 275 | 65 min | C, 240 | C, 250 |
| 14 | 95.7% | 100.0% | D, 260 | 80 min | C, 210 | C, 220 |
| 15 | 95.8% | 100.0% | D, 240 | 80 min | C, 200 | C, 200 |
| 16 | 95.8% | 100.0% | D, 230 | 85 min | C, 185 | B, 170 |
| 17 | 95.8% | 100.0% | C, 230 | 95 min | C, 160 | B, 150 |
| 4 | 95.9% | 99.5% | C, 200 | 120 min | B, 90 | B, 90 |
| 18 | 94.4% | 97.0% | B, 160 | 110 min | B, 120 | B, 130 |
| 19 | 92.8% | 95.0% | B, 140 | 85 min | B, 150 | B, 160 |
| 20 | 92.3% | 92.0% | B, 120 | 70 min | C, 210 | C, 250 |
| 21 | 88.7% | 89.0% | B, 200 | 40 min | D, 300 | D, 320 |
| 4 | 95.9% | 99.5% | C, 200 | 120 min | B, 90 | B, 90 |
| 22 | 95.8% | 99.5% | C, 270 | 75 min | B, 120 | B, 130 |
| 23 | 94.9% | 99.5% | C, 300 | 55 min | C, 230 | C, 210 |
| 24 | 95.2% | 96.5% | D, 300 | 35 min | C, 230 | C, 210 |
| 25 | 95.4% | 97.5% | C, 250 | 65 min | C, 200 | B, 150 |
| 26 | 95.5% | 98.0% | C, 230 | 70 min | B, 100 | B, 95 |
| 4 | 95.9% | 99.5% | C, 200 | 120 min | B, 90 | B, 90 |
| 27 | 95.8% | 100.0% | C, 230 | 95 min | C, 160 | B, 150 |
| 28 | 95.8% | 100.0% | D, 230 | 85 min | C, 185 | B, 170 |
| 29 | 95.8% | 100.0% | D, 240 | 80 min | C, 200 | C, 200 |
| 30 | 95.7% | 100.0% | D, 260 | 80 min | C, 210 | C, 220 |
| 31 | 95.8% | 100.0% | D, 275 | 65 min | C, 240 | C, 250 |
| 4 | 95.9% | 99.5% | C, 200 | 120 min | B, 90 | B, 90 |
| 32 | 95.8% | 99.5% | C, 230 | 110 min | B, 100 | B, 90 |
| 33 | 94.9% | 99.5% | D, 240 | 130 min | B, 90 | B, 100 |
| 34 | 94.4% | 99.5% | D, 250 | 150 min | B, 85 | D, 75 |
| 35 | 95.5% | 98.0% | C, 230 | 70 min | B, 110 | B, 120 |
| 4 | 95.9% | 99.5% | C, 200 | 120 min | B, 90 | B, 90 |
| 36 | 94.4% | 97.5% | C, 220 | 130 min | B, 70 | B, 65 |
| 37 | 95.9% | 95.5% | B, 160 | 150 min | A, 40 | B, 70 |
| Comparative Examples | | | | | | |
| 1 | 90.9% | 100.0% | D, 340 | 7 min | D, 310 | D, 330 |
| 2 | 89.8% | 97.0% | D, 440 | 6 min | D, 400 | D, 410 |
| 3 | 92.2% | 93.3% | D, 340 | 40 min | D, 310 | D, 290 |
| 4 | 87.2% | 87.3% | B, 180 | 30 min | D, 280 | D, 290 |

Remarks: A: No change, B: Smoke, C: Fire, D: Explosion

By comparing Examples 1-11 to Comparative Examples 1-2, it can be known that when a metal oxide is present on the surface of the active material to form a negative electrode composite material and the ratio of the specific surface of the negative electrode composite material to the specific surface of the active material is 1-7, with respect to the case where the negative electrode composite material does not contain the metal oxide or the ratio of the specific surface of the negative electrode composite material to the specific surface of the active material is not in the range of 1 to 7, the lithium ion battery has a higher cycle capacity retention rate and almost no loss of energy density, has a lower surface maximum temperature with an overcharge of 10V, has a longer thermal shock withstand time, and a lower surface maximum temperature after puncturing test and impact test.

By comparing Examples 4, 12-21 and Comparative Example 3, it can be known that when the metal oxide accounts for 0.1%-15% of the mass fraction of the negative electrode composite material, the lithium ion battery has a higher cycle capacity retention rate and almost no loss of energy density, has a lower surface maximum temperature with an overcharge of 10V, has a longer thermal shock withstand time of 40 min or more, and a lower surface maximum temperature after puncturing test and impact test.

It can be known from Examples 4 and 22-23 that when the morphology of the metal oxide is nanowires and nanosheets, the same technical effects as when the morphology of the metal oxide is nanoparticle may be achieved, that is, the lithium ion battery has a higher cycle capacity retention rate and almost no loss of energy density, has a lower surface maximum temperature with an overcharge of 10V, has a longer thermal shock withstand time, and a lower surface maximum temperature after puncturing test and impact test.

It can be known from Examples 4 and 32-37 that Both the metal oxide and the active material may be selected as a combination of one or more materials while still achieving the corresponding technical effects, that is, the lithium ion battery has a higher cycle capacity retention rate and almost no loss of energy density, has a lower surface maximum temperature with an overcharge of 10V, has a longer thermal shock withstand time, and a lower surface maximum temperature after puncturing test and impact test.

By comparing Examples 4, 24-31 to Comparative Examples 5-6, it can be known that when the median diameter D50 of the negative electrode composite material is 9-30 μm, the lithium ion battery has a higher cycle capacity retention rate and almost no loss of energy density, has a lower surface maximum temperature with an overcharge of 10V, has a longer thermal shock withstand time, and a lower surface maximum temperature after puncturing test and impact test.

Those skilled in the art will appreciate that the above-described examples are merely exemplary examples, and various changes, substitutions and changes may be made without departing from the spirit and scope of the present application.

What is claimed is:

1. A negative electrode composite material, comprising:
   an active material; and
   a metal oxide on the surface of the active material, the ratio of a specific surface area of the negative electrode composite material to a specific surface area of the active material being 1-2.5, wherein the metal oxide is titanium oxide,
      wherein the active material comprises one or more of natural graphite and artificial graphite; and
      wherein, the metal oxide is 0.1%-15% by weight.

2. The negative electrode composite material according to claim 1, wherein the negative electrode composite material has a median diameter D50 of 9 to 30 μm.

3. The negative electrode composite material according to claim 1, wherein the metal oxide accounts for 1% to 10% by weight of the negative electrode composite material.

4. The negative electrode composite material according to claim 1, wherein the metal oxide comprises one or more of a nanoparticle, a nanowire and a nanosheet.

5. The negative electrode composite material according to claim 4, wherein the nanoparticle has a median diameter D50 of 0.5-100 nm; the nanowires have a length to diameter ratio of 2-200; the nanosheet has a sheet thickness of 0.5-10 nm and a sheet aspect ratio of 1-10.

6. The negative electrode composite material according to claim 1, wherein the active material further comprises one or more of amorphous carbon material and silicon material; the amorphous carbon material comprises one or more of mesocarbon microbeads, hard carbon materials and soft carbon material.

7. A negative electrode, wherein the negative electrode comprises a negative electrode composite material, and the negative electrode composite material comprises:
   an active material; and
   a metal oxide on the surface of the active material, the ratio of a specific surface area of the negative electrode composite material to a specific surface area of the active material being 1-2.5, wherein the metal oxide is titanium oxide,
   wherein, the metal oxide is 0.1%-15% by weight; and
   wherein the active material comprises one or more of natural graphite and artificial graphite.

8. The negative electrode according to claim 7, wherein the negative electrode composite material has a median diameter D50 of 9 to 30 μm.

9. The negative electrode according to claim 7, wherein the metal oxide accounts for 1% to 10% by weight of the negative electrode composite material.

10. The negative electrode according to claim 7, wherein the metal oxide comprises one or more of a nanoparticle, a nanowire and a nanosheet.

11. The negative electrode according to claim 10, wherein the nanoparticle has a median diameter D50 of 0.5-100 nm; the nanowire has a length to diameter ratio of 2-200; the nanosheet has a sheet thickness of 0.5-10 nm and a sheet aspect ratio of 1-10.

12. A lithium ion battery, wherein the lithium ion battery comprises the negative electrode according to claim 7.

* * * * *